(12) United States Patent
Shrestha et al.

(10) Patent No.: US 8,693,554 B2
(45) Date of Patent: Apr. 8, 2014

(54) CAPACITIVE COMMUNICATION CIRCUIT AND METHOD THEREFOR

(75) Inventors: Rameswor Shrestha, Eindhoven (NL); Patrick Emanuel Gerardus Smeets, Weert (NL)

(73) Assignee: NXP B.V., Eindhoven (NL)

( * ) Notice: Subject to any disclaimer, the term of this patent is extended or adjusted under 35 U.S.C. 154(b) by 380 days.

(21) Appl. No.: 13/230,134

(22) Filed: Sep. 12, 2011

(65) Prior Publication Data

US 2013/0064310 A1   Mar. 14, 2013

(51) Int. Cl.
*H04B 3/18* (2006.01)

(52) U.S. Cl.
USPC ......................................................... 375/257

(58) Field of Classification Search
USPC ......... 375/219, 220, 256, 257, 259–261, 269, 375/273, 275, 280, 281, 283, 264; 455/39, 455/43, 59–61, 73, 86; 327/35, 37, 191, 327/215, 217, 219, 221, 222, 293, 294
See application file for complete search history.

(56) References Cited

U.S. PATENT DOCUMENTS

| | | | | |
|---|---|---|---|---|
| 5,500,895 A | * | 3/1996 | Yurgelites | 379/412 |
| 5,949,826 A | * | 9/1999 | Iiyama et al. | 375/279 |
| 2005/0036604 A1 | * | 2/2005 | Scott et al. | 379/413 |
| 2009/0213914 A1 | * | 8/2009 | Dong et al. | 375/219 |

* cited by examiner

*Primary Examiner* — Young T. Tse

(57) ABSTRACT

Data is communicated. In accordance with one or more example embodiments, a communications circuit communicates a digital data signal using a carrier signal having a frequency that is different than the frequency of the data signal. The communications circuit includes first and second sets of capacitors, a first circuit and a second circuit. The first circuit generates mixed data signals respectively mixed with the carrier signal and an inverse of the carrier signal, generates mixed inverted data signals respectively mixed with the carrier signal and an inverse of the carrier signal, provides the mixed data signals to the first set of capacitors, and provides the mixed inverted data signals to the second set of capacitors. The second circuit recovers the data signal from the mixed signals.

19 Claims, 3 Drawing Sheets

CAPACITIVE COMMUNICATION CIRCUIT AND METHOD THEREFOR

In many electronic circuit applications, different circuit components use different types of power. For example, applications such as electric vehicles, mains power supply, and motor drivers employ high voltage and low voltage domains, in which the low voltage domain may be used for controlling aspects of the high voltage domain. In such applications, the respective domains are desirably isolated from each other, for safety reasons and/or to protect sensitive circuits from high voltages.

One example type of circuit isolation is galvanic isolation, which allows the exchange of information between two parts of an electric circuit with separate grounds or two electric circuits without the actual flow of charge carriers between them. Galvanic isolation has been used in a variety of circuits, including those having different parts that operate at significantly different voltages in order to protect a lower voltage part, avoid unwanted ground loop bias, and achieve other desirable characteristics.

An optocoupler circuit is one type of galvanic isolation circuit that has been employed to facilitate communications between circuits operating at different voltages. Optocouplers use light emitters and detectors (e.g., a light emitting photodiode and a photodetector) that are respectively coupled to electrically isolated circuits, and are further electrically isolated from one another.

While optocouplers and other isolation circuits can be useful, they can be relatively complex and added complexity/cost may be associated with interfacing transmitters and receivers. Optocouplers can also be sensitive to parameter variation, high power consumption and low bandwidth. Accordingly, the implementation of circuits requiring electrical and/or galvanic isolation continues to be challenging.

Various example embodiments are directed to isolation circuits and approaches, and to addressing various challenges including those discussed above.

According to an example embodiment, capacitive signal communications are effected. An input signal is inverted, and both the inverted and non-inverted input signals are separately mixed (e.g., modulated) with a carrier signal having a frequency that is different than the frequency of the input signal. The mixed signals are communicated capacitively over a circuit that passes frequencies of the carrier signal, facilitating undesirable coupling of signals of the input signal frequency, such as for isolating circuits operating at different voltages.

Another example embodiment is directed to a communications circuit for communicating a digital data signal using a carrier signal having a frequency that is different than the frequency of the data signal, the communications circuit including sets of isolation capacitors and first and second circuits for passing the data signal. The first circuit uses the data signal and the carrier signal, generates mixed data signals respectively mixed with the carrier signal and an inverse of the carrier signal, and generates mixed inverted data signals respectively mixed with the carrier signal and an inverse of the carrier signal. The mixed data signals are provided to the first set of the isolation capacitors, and the mixed inverted data signals are provided to a second set of the isolation capacitors. The second circuit recovers the data signal from the mixed signals passed respectively via the first and second sets of capacitors.

Another example embodiment is directed to a communications circuit having inversion circuits, a capacitive circuit including first and second sets of capacitors, and signal-mixing circuits. One of the inversion circuits inverts a data signal to provide an inverted data signal, and another one of the inversion circuits inverts a carrier signal to provide an inverted carrier signal, the carrier signal having a frequency that is different than the frequency of the data signal. The first signal-mixing circuit combines the data signal with at least one of the carrier signal and the inverted carrier signal, and thereby provides a combined data signal to the first set of capacitors. The first signal-mixing circuit also combines the inverted data signal with at least one of the carrier signal and the inverted carrier signal and thereby provides a combined inverted data signal to the second set of capacitors. The second signal-mixing circuit recovers the data signal from the combined data signal and the combined inverted data signal is passed respectively via the first and second sets of capacitors.

Another example embodiment is directed to a method for communicating a digital data signal using a carrier signal having a frequency that is different than the frequency of the data signal. Using the digital data signal and the carrier signal, data signals are respectively mixed with the carrier signal and an inverse of the carrier signal, and inverted data signals are respectively mixed with the carrier signal and an inverse of the carrier signal. The mixed data signals are provided to a first set of capacitors, and the mixed inverted data signals are provided to a second set of capacitors. The data signal is recovered from the mixed signals passed respectively via the first and second sets of capacitors.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

Figure 1:
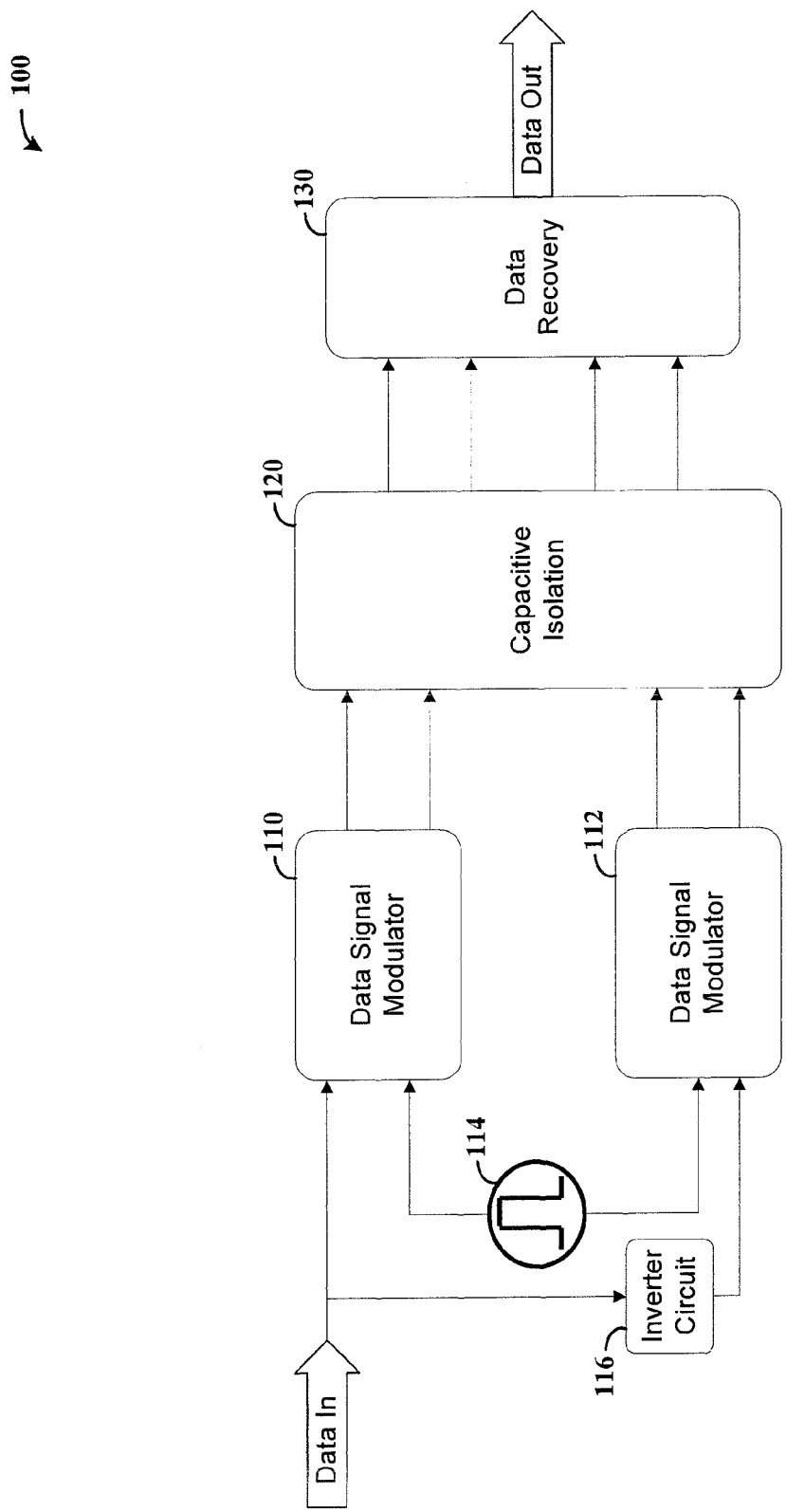
FIG. 1 shows a communications circuit, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of different types of circuits, devices and systems for and/or involving communications across a capacitive isolation barrier. While the present invention is not necessarily limited in this context, various aspects of the invention may be appreciated through a discussion of related examples.

In accordance with various example embodiments, signal communications are effected capacitively, using an input signal and an inverted version of the input signal. Each of the respective input signal and inverted input signal is separately mixed (e.g., modulated) with a carrier signal having a frequency that is different than the frequency of the input signal, as well as with an inverted version of the carrier signal. These mixed signals are communicated capacitively and the original input signal is recovered from the capacitive communication.

Using this approach, circuits on transmission and receiving sides of the capacitive communication can be effectively isolated from one another, such as may be useful for isolating circuits operating at different voltages (e.g., battery circuits), and where one voltage level of such a circuit could harm the other circuit. Furthermore, this approach can be implemented to provide immunity to voltage transients from one circuit to the other circuit. Moreover, this approach can be used to accurately recover signals, as the various signals received via the capacitive communication for each respective mixed signal provide an accurate indication of rising and falling edges of the signals. In certain implementations, this approach can be carried out without necessarily employing analog filtering at the receiving/recovery side of the communications.

In various embodiments, the capacitive communications are effected using pairs of capacitors. A first pair of capacitors includes capacitors respectively used to communicate the input signal as modulated with the carrier signal and with an inverted version of the carrier signal. A second pair of capacitors includes capacitors respectively used to communicate an inverted version of the input signal, as respectively modulated with the carrier signal and with an inverted version of the carrier signal. Accordingly, four signals are capacitively communicated and used to recover the input signal.

In a more particular embodiment, pulses corresponding to the four signals are generated and used to recover the input signal. Pulses from each of the capacitors are consecutively-spaced during an active portion of the signal (e.g., when the signal is positive for the first pair of capacitors, and when the signal is negative for the second pair of capacitors). For instance, the output of the first set of capacitors can be used to determine a rising edge of the data signal, and the output of the second set of capacitors can be used to determine a falling edge of the data signal. Accordingly, a first pulse of each series from the first pair of capacitors can be used as an indication of a rising edge of the signal, and a first pulse of each series from the second pair of capacitors can be used as an indication of a falling edge of the signal. A last pulse of each respective series may also be used to determine the rising and falling edges of the signal.

In some implementations, the pulses are generated based upon a differential between the respective capacitors in each of the sets of capacitors. For instance, comparators can be used to compare a capacitive communication of the input signal mixed with the carrier signal, with a capacitive communication of the input signal mixed with the inverted carrier signal. Each comparator has its positive and negative input respectively coupled with different ones of the signals, each signal being coupled to a positive input of one of the comparators and to a negative input of the other one of the comparators.

The capacitive communications can be effected to isolate or otherwise protect from the unwanted coupling of signals, in a variety of manners. For example, a capacitive circuit as discussed above can be configured to pass high frequency signals, or low frequency signals, depending upon the particular application, the input signal type and the carrier signal type.

In some implementations, the capacitive circuit includes resistors coupled to a voltage supply on the receiver side of the circuit, and configured with the capacitors to effect the passage of the carrier signal frequency. The resistors are used to make the receiver side impedance low. During voltage transient at either ground, the current will flow through the isolation capacitor. Because of the low impedance termination, the receiver side does not clip and the receiver continues to function, providing high common mode transient immunity.

Another example embodiment is directed to a communications circuit having inversion circuits that respectively invert a data signal and a carrier signal having a frequency that is different than the frequency of the data signal. First and second signal-mixing circuits respectively transmit and receive communications using a capacitive circuit. The first signal-mixing circuit separately combines each of the data signal and the inverted data signal with at least one of the carrier signal and the inverted carrier signal, to provide outputs corresponding to each signal. The second signal-mixing circuit recovers the data signal from the combined data signal and the combined inverted data signal, which are passed respectively via the capacitive circuit.

For example, the first signal-mixing circuit may separately combine the data signal with each of the carrier signal and the inverted carrier signal to generate two mixed signals. Similarly, the first signal-mixing circuit may separately combine the inverted data signal with each of the carrier signal and the inverted carrier signal to generate two additional mixed signals, corresponding to the inverted data signal.

The passed signals can be processed using approaches as discussed above, such as by generating and using pulses corresponding to both the modulated data signal and the inverted modulated data signal. The data signal can be recovered using the pulses as an indication of a rising and/or falling edge of the data signal Turning now to the figures, FIG. 1 shows a communications circuit 100 with capacitive isolation/communication components, in accordance with another example embodiment of the present invention. The circuit 100 includes, on a transmission side, two data signal modulator circuits 110 and 112, an oscillator 114 and an inverter circuit 116. A capacitive isolation circuit 120 separates the transmission side from a receiver side, the latter of which includes a data recovery circuit 130. Data input at the transmission side is processed and capacitively communicated, via the capacitive isolation circuit 120, to the receiver side.

The data input signal is provided directly to the signal modulator circuit 110, and is first inverted via inverter circuit 116 before being provided to the signal modulator circuit 112. The oscillator 114 provides a carrier signal to each of the signal modulator circuits 110 and 112. Each of the respective signal modulator circuits 110 and 112 combines the received data signal or inverted data signal with an output of the oscillator, and provides outputs to the capacitive isolation circuit 120. The signal modulator circuits 110 and 112 respectively combine the data (or inverted data) signals provided thereto with the oscillator output and an inverted version of the oscillator output. For the latter combination, the signal modulator circuits 110 and 112 may carry out the oscillator signal inversion, or the inversion may be carried out elsewhere (e.g., using an inverter circuit between the oscillator 114 and the signal modulator circuits).

The capacitive isolation circuit 120 capacitively passes the outputs received from the signal modulator circuits 110 and 112, to the data recovery circuit 130. The respective signals are processed at the data recovery circuit to generate pulses that are used to determine rising and falling edges for reconstruction of the original input signal. For example, first and last ones of a series of consecutive pulses from the data signal modulator 110 can be used as an indication of the start and end of a positive segment of the input signal. Correspondingly, first and last pulses of a series of consecutive pulses from the data signal modulator 112 can respectively be used as an indication of the end and start of the positive segment of the input signal.

Figure 2:
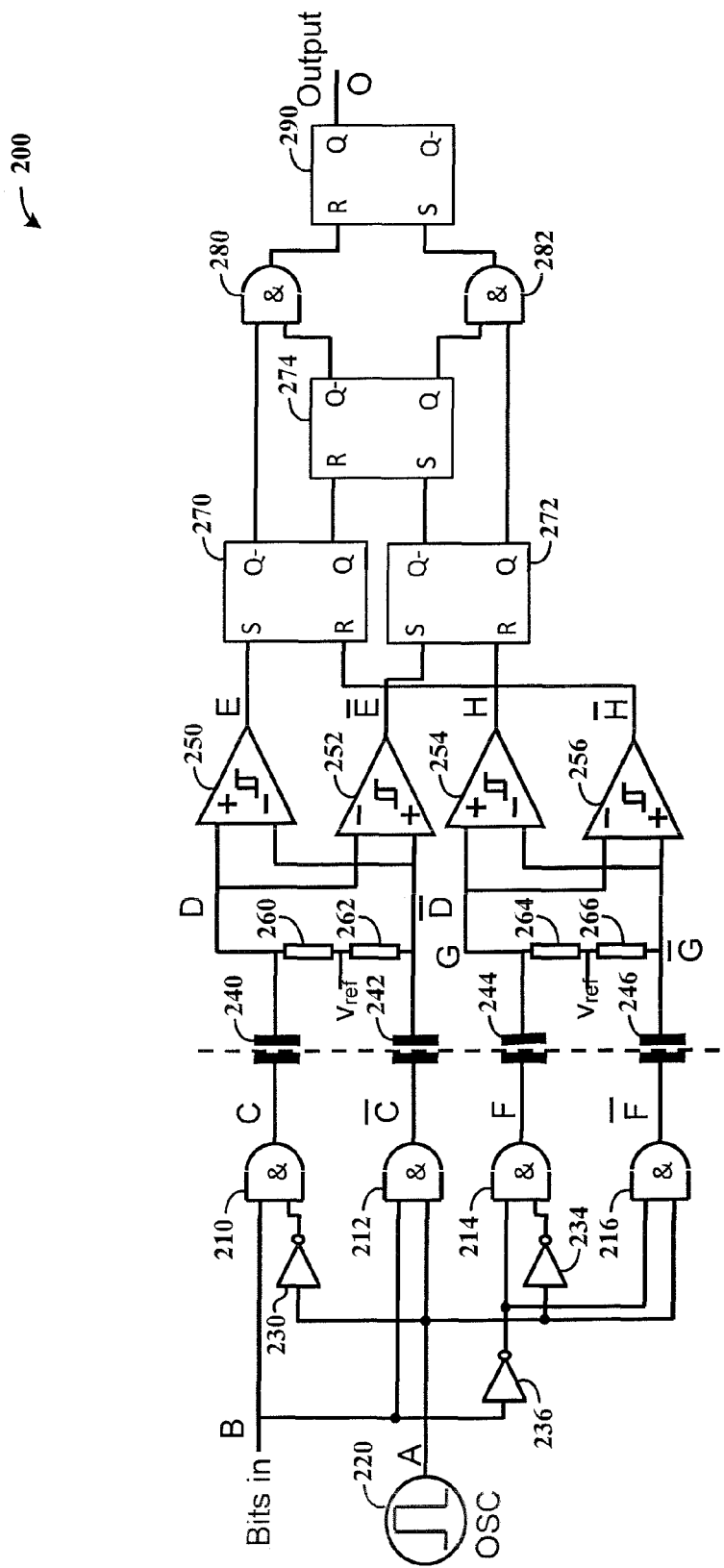
FIG. 2 shows a capacitive communications circuit, in accordance with another example embodiment of the present invention.

In accordance with another example embodiment, FIG. 2 shows a capacitive communications circuit 200 for communicating an input signal to an output over a capacitive circuit. The circuit 200 includes several AND gates 210, 212, 214 and 216, respectively coupled to receive an input data signal (at B) and an oscillator signal from oscillator 220. Inverter circuits 230 and 234 respectively invert the oscillator signal provided to the AND gates 210 and 214. Inverter circuit 236 inverts the input data signal and provides the inverted input data signal to the AND gates 214 and 216. The outputs of the AND gates 210, 212, 214 and 216 are respectively provided to isolation capacitors 240, 242, 244 and 246.

On the receiver (right) side of the circuit 200, the capacitors 240, 242, 244 and 246 are connected to provide outputs to a plurality of comparators 250, 252, 254 and 256, with the signals provided thereto being generated via resistors 260, 262, 264 and 266, and $V_{ref}$ coupled thereto as shown. Each of the comparators 250 and 252 has two inputs respectively coupled to an output of the capacitors 240 and 242 as shown, alternating at the positive and negative inputs thereof. Similarly, each of the comparators 254 and 256 has two inputs respectively coupled to an output of the capacitors 244 and 246 as shown. The outputs of comparators 250 and 256 are respectively coupled to the set and reset inputs of flip-flop 270, and the outputs of comparators 252 and 254 are respectively coupled to the set and reset inputs of flip-flop 272. Accordingly, the outputs corresponding to input signal are provided to the respective set inputs, and the outputs corresponding to the inverted input signal are provided to the respective reset inputs.

The receiver side of the circuit 200 also includes a third flip-flop 274, AND gates 280 and 282, and a fourth flip-flop 290. The outputs of the flip-flop 270 are respectively provided to the AND gate 280 and the reset input of the flip-flop 274, an output of which is also provided to the AND gate 280. The outputs of flip-flop 272 are respectively provided to the AND gate 282 and the set input of flip-flop 274, an output of which is also provided to the AND gate 282. The outputs of the AND gates 280 and 282 are respectively provided to reset and set inputs of the flip-flop 290, the output of which corresponds to the recovered input signal.

Accordingly, the AND gates 210, 212, 214 and 216 respectively mix, or modulate, the input signal and an inverted version of the input signal with the oscillator signal and an inverted version of the oscillator signal. This combination of signals provides outputs at the capacitive circuits 240, 242, 244 and 246 that correspond to respective series of pulses indicative of rising and falling edges of the input signal. In this regard, the receiver side of the circuit processes the pulses to (effectively) identify rising and falling edges of the recovered signal and, correspondingly, provide the output at flip-flop 290 corresponding to the input signal.

Figure 3:
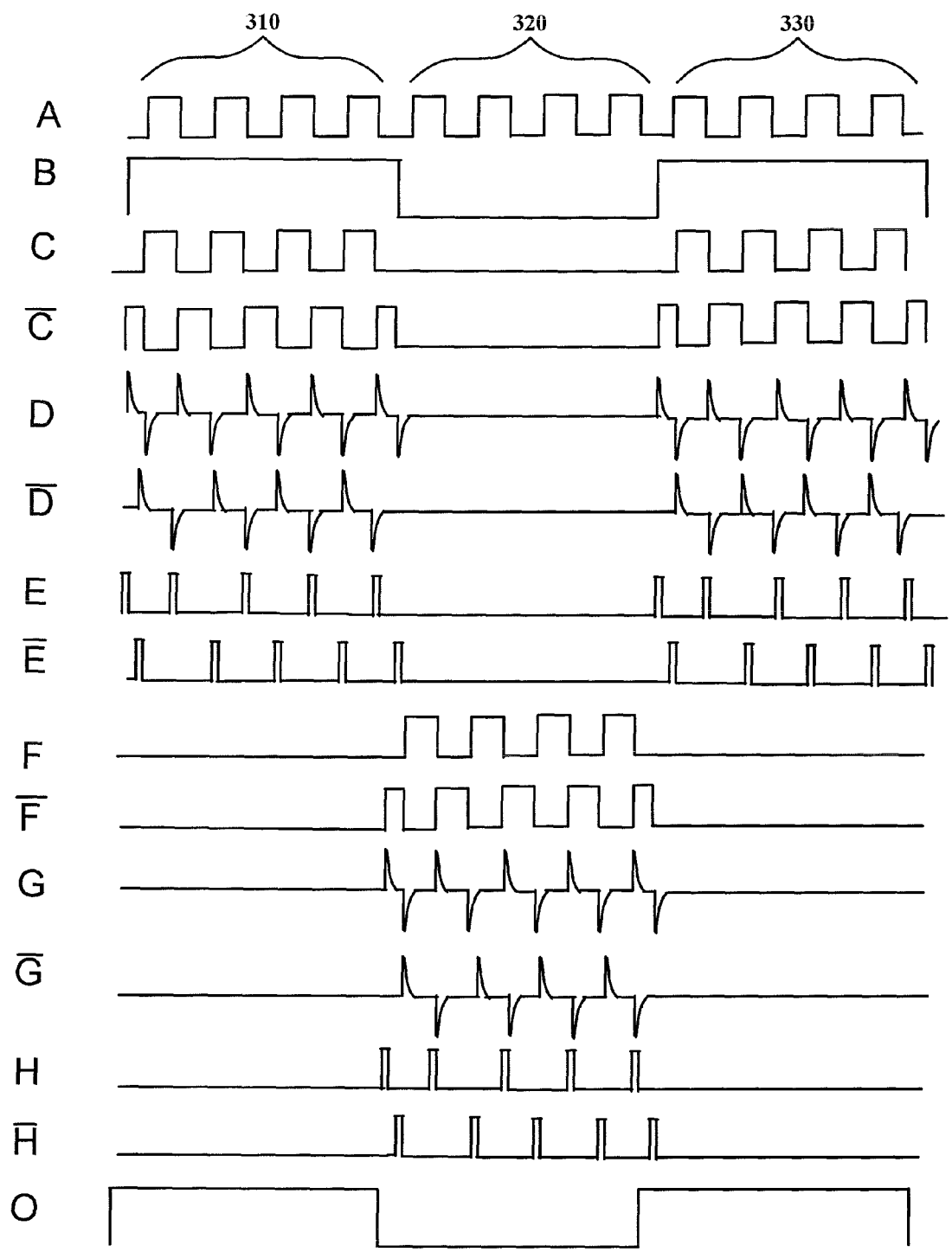
FIG. 3 is a signal diagram showing exemplary signals corresponding to the operation of a capacitive communication circuit, in accordance with another example embodiment of the present invention.

FIG. 3 is a signal diagram showing exemplary signals corresponding to the operation of a capacitive isolation circuit, in accordance with another example embodiment of the present invention. The signal diagram in FIG. 3 may be implemented with a circuit as shown in FIG. 2, or with similar circuits configured for communicating capacitive signals as discussed herein. By way of example, FIG. 2 shows corresponding references to the indicated signals in FIG. 3. In this context, signal A is an output signal from the oscillator 220, signal B is the input signal, and signal O is the output signal. Signals C and D correspond respectively to the input signal modulated with the inverted oscillator signal, and a corresponding capacitive output. Signals $\overline{C}$ and $\overline{D}$ correspond respectively to the input signal modulated with the oscillator signal, and a corresponding capacitive output. Signals F and G correspond respectively to the inverted input signal modulated with the inverted oscillator signal, and a corresponding capacitive output. Signals $\overline{F}$ and $\overline{G}$ correspond respectively to the inverted input signal modulated with the oscillator signal, and a corresponding capacitive output.

Signals E and $\overline{E}$ correspond respectively outputs of comparators 250 and 252, as pulses for the non-inverted input signal. Signals H and $\overline{H}$ correspond respectively outputs of comparators 254 and 256, as pulses for the inverted input signal. These signals are processed at the flip-flops 270, 272, 274 and 290, as well as at AND gates 280 and 282, to produce the output signal O.

The signal transfer across the isolation capacitor in the proposed embodiment is thus based on the polarity of the data signal. Assuming, by way of example, that the oscillator frequency is higher than the maximum data rate, an incoming bit stream at B is modulated with a square wave oscillator signal A, and the modulated signal is transferred across the upper differential pair of isolation capacitors 240 and 242. Similarly the inverted incoming bit stream is modulated with the oscillator signal A and transferred across the lower differential pair of isolation capacitors 244 and 246. The isolation capacitors and the termination resistance (260, 262, 264, 266) at the receiving node acts as a high pass filter for the incoming signals C, $\overline{C}$, F and $\overline{F}$. Comparators 250, 252, 254 and 256 at the receiving end convert the incoming signals into short output pulses as shown in FIG. 3.

At node E or $\overline{E}$, the start of a short pulse coincides with the rising edge of the data signal. Similarly, at node H or $\overline{H}$, the start of the short pulse coincides with the falling edge of the data signal. The start of these short pulses is used to detect the rising and falling edge of the data in recovering/generating the output signal, facilitating a low propagation delay and pulse width distortion. Referring to time periods represented at 310, 320 and 330, the start of a first one of a series of consecutively-spaced short pulses occurring during time period 310 can be used as an indication of a rising edge of the data signal. During time period 320, the aforesaid short pulses (at node E or $\overline{E}$) are not present, with the start of another series of consecutively-spaced short pulses (at node H or $\overline{H}$) being indicative of a falling edge of the data signal. During time period 330, another series of short pulses (at node E or $\overline{E}$) begins and is again indicative of the rising edge of the data signal.

While FIG. 3 shows a specific implementation, other approaches may be used with alternate combinations of inverted signals, with different frequencies, and with different recovery/output generation approaches. For instance, the falling edge of a last one of the pulses (at node E or $\overline{E}$) with time periods 310 and 330 as discussed above can be used as an indication of the falling edge of the data signal, in lieu of and/or in addition to using a rising edge of a first one of the pulses in time period 320 (at node H or $\overline{H}$). Similarly, the falling edge of a last one of the pulses (at node H or $\overline{H}$) in time period 320 can be used as an indication of the rising edge of the data signal in transitioning from time period 320 to 330.

The various approaches as discussed herein can be carried out with both DC and AC communications, and without analog filtering at the receiver side. Reliable data transfer is facilitated, as both signal and data are differential. In addition, the presence of a carrier at the receiver can be used for failsafe functionality under various modes of operation, including operation involving the transmission of very low speed data.

Based upon the above discussion and illustrations, those skilled in the art will readily recognize that various modifications and changes may be made to the present invention without strictly following the exemplary embodiments and applications illustrated and described herein. For example, various manners may be effected to recover a data signal as discussed herein, and different aspects of pulses generated from a filter/capacitive type circuit can be used to determine rising and falling edges of an original signal. Modulation shown as involving a carrier frequency that is higher than an input signal frequency, and related passage of high-frequency signals, can be implemented using a carrier frequency that is lower than a frequency of the input signal with related passage of low-frequency signals. Further, the various circuits may be implemented in a variety of different devices to suit different applications, such as automotive applications, high-powered battery applications and with other systems involving various components that operate at different voltage levels. Such modifications do not depart from the true spirit and scope of the present invention, including that set forth in the following claims. Furthermore, the term "example" as used throughout this document is by way of illustration, and not limitation.

What is claimed is:

1. A communications circuit for communicating a digital data signal using a carrier signal having a frequency that is different than the frequency of the digital data signal, the communications circuit comprising:
   first and second sets of capacitors;
   a first circuit configured and arranged to,
   using the digital data signal and the carrier signal, generate mixed data signals by respectively mixing the digital data signal with the carrier signal and an inverse of the carrier signal, and generate mixed inverted data signals by respectively mixing an inverse of the digital data signal with the carrier signal and the inverse of the carrier signal, and
   provide the mixed data signals to the first set of capacitors, and provide the mixed inverted data signals to the second set of capacitors; and
   a second circuit configured and arranged to recover the digital data signal from the mixed data signals and the mixed inverted data signals passed respectively via the first and second sets of capacitors.

2. The circuit of claim 1, wherein the second circuit is configured and arranged to recover the digital data signal from the mixed data signals and the mixed inverted data signals by converting differential signals from the first and second sets of capacitors respectively into pulses corresponding to a modulated data signal and pulses corresponding to an inverted modulated data signal, and recovering the digital data signal from the pulses.

3. The circuit of claim 1, wherein the second circuit is configured and arranged to recover the digital data signal from the mixed data signals and the mixed inverted data signals by
   generating, based upon a value at the respective first and second sets of capacitors, pulses corresponding to a modulated data signal and pulses corresponding to an inverted modulated data signal, and
   recovering the digital data signal from the pulses by identifying at least one of a rising edge and a falling edge of the digital data signal based upon at least one of first and last pulses in respective series of consecutively-spaced pulses from each of the respective first and second sets of capacitors.

4. The circuit of claim 1, wherein the second circuit is configured and arranged to recover the digital data signal from the mixed data signals and the mixed inverted data signals by recovering the digital data signal using the output of the first set of capacitors to determine a rising edge of the digital data signal, and using the output of the second set of capacitors to determine a falling edge of the digital data signal.

5. The circuit of claim 1, wherein the first and second sets of capacitors are respectively coupled with resistors configured and arranged to lower impedance of the second circuit and mitigate clip on the second circuit during the presence of a voltage transient at either the first or second circuit.

6. The circuit of claim 1, wherein the first circuit is configured and arranged to generate the inverse of the carrier signal by inverting the carrier signal.

7. The circuit of claim 1, wherein
   the first set of capacitors includes a capacitor coupled to receive the digital data signal mixed with the carrier signal, and a capacitor coupled to receive the digital data signal mixed with the inverse of the carrier signal, and
   the second set of capacitors includes a capacitor coupled to receive the inverse of the digital data signal mixed with the carrier signal, and a capacitor coupled to receive the inverse of the digital data signal mixed with the inverse of the carrier signal.

8. The circuit of claim 1, wherein
   the first set of capacitors includes a capacitor coupled to receive the digital data signal mixed with the carrier signal, and a capacitor coupled to receive the digital data signal mixed with the inverse of the carrier signal,
   the second set of capacitors includes a capacitor coupled to receive the inverse of the digital data signal mixed with the carrier signal, and a capacitor coupled to receive the inverse of the digital data signal mixed with the inverse of the carrier signal, and
   the second circuit is configured and arranged to recover the digital data signal by generating a first and second series of consecutively-spaced pulses based upon a differential output of the first set of capacitors, generating a third and fourth series of consecutively-spaced pulses based upon a differential output of the second set of capacitors, and identifying rising and falling edges of the recovered digital data signal based upon at least one of a beginning and an end of at least one of the series of consecutively-spaced pulses for each of the first and second sets of capacitors.

9. The circuit of claim 1 wherein
   at least one of the first and second circuits is coupled to a high-voltage circuit, and
   the first and second sets of capacitors are configured and arranged to block signals having the frequency of the digital data signal and pass signals having the frequency of the carrier signal, and to block high-voltage signals from the at least one of the first and second circuits from reaching the other of the first and second circuits.

10. The circuit of claim 1, wherein the first circuit includes an oscillator configured and arranged to generate the carrier signal;
   first, second, third and fourth AND gates respectively having two inputs and an output, the outputs of the first and second AND gates being connected to respective capacitors in the first set of capacitors, the outputs of the third and fourth AND gates being connected to respective capacitors in the second set of capacitors,
   a first inverter circuit, connected between the oscillator and inputs of the first and third AND gates, and configured and arranged to invert the carrier signal from the oscillator and to provide the inverse of the carrier signal to the first and third AND gates, a second inverter circuit connected to inputs of the third and fourth AND gates and configured and arranged to invert the digital data signal and provide the inverse of the digital data signal to the third and fourth AND gates, the first and second inverter circuits being connected to different inputs of the third AND gate, and the first AND gate being configured and arranged to generate one of the mixed data signals by combining the inverted carrier signal with the digital data signal, the second AND gate being configured and arranged to generate one of the mixed data signals by combining the carrier signal with the digital data signal, the third AND gate being configured and arranged to generate one of the mixed inverted data signals by combining the inverted carrier signal with the inverted digital data signal, and the fourth AND gate being configured and arranged to generate one of the mixed inverted data signals by combining the carrier signal with the inverted digital data signal.

11. A communications circuit comprising:

a first inversion circuit configured and arranged to invert a data signal to provide an inverted data signal;

a second inversion circuit configured and arranged to invert a carrier signal to provide an inverted carrier signal, the carrier signal having a frequency that is different than the frequency of the data signal;

a capacitive circuit including first and second sets of capacitors;

a first signal-mixing circuit configured and arranged to combine the data signal with at least one of the carrier signal and the inverted carrier signal and thereby provide a combined data signal to the first set of capacitors, and combine the inverted data signal with at least one of the carrier signal and the inverted carrier signal and thereby provide a combined inverted data signal to the second set of capacitors; and a second signal-mixing circuit configured and arranged to recover the data signal from the combined data signal and the combined inverted data signal passed respectively via the first and second sets of capacitors.

12. The circuit of claim 11, wherein the first signal-mixing circuit is configured and arranged to combine the data signal with at least one of the carrier signal and the inverted carrier signal by combining the data signal with each of the carrier signal and the inverted carrier signal to generate two mixed signals, and provide the two mixed signals to the first set of capacitors, and combine the inverted data signal with at least one of the carrier signal and the inverted carrier signal by combining the inverted data signal with each of the carrier signal and the inverted carrier signal to generate two mixed inverted signals, and provide the two mixed inverted signals to the second set of capacitors.

13. The circuit of claim 11, wherein the second signal-mixing circuit is configured and arranged to recover the data signal from the combined data signal and the combined inverted data signal by generating, based upon a value at the respective first and second sets of capacitors, pulses corresponding to a modulated data signal and pulses corresponding to an inverted modulated data signal, and recovering the data signal from the pulses by identifying at least one of a rising edge and a falling edge of the data signal based upon at least one of first and last pulses in respective series of consecutively-spaced pulses from each of the respective first and second sets of capacitors.

14. The circuit of claim 11, wherein the second signal-mixing circuit is configured and arranged to recover the data signal from the combined data signal and the combined inverted data signal by using an output of the first set of capacitors to determine a rising edge of the data signal, and using an output of the second set of capacitors to determine a falling edge of the data signal.

15. A method for communicating a digital data signal using a carrier signal having a frequency that is different than the frequency of the data signal, the method comprising:

using the digital data signal and the carrier signal, generating mixed data signals by respectively mixing the digital data signal with the carrier signal and an inverse of the carrier signal, and generating mixed inverted data signals by respectively mixing an inverse of the digital data signal with the carrier signal and the inverse of the carrier signal;

providing the mixed data signals to a first set of capacitors;

providing the mixed inverted data signals to a second set of capacitors; and recovering the digital data signal from the mixed data signals and the mixed inverted data passed respectively via the first and second sets of capacitors.

16. The method of claim 15, wherein recovering the digital data signal from the mixed data signals and the mixed inverted data signals includes converting differential signals from the first and second sets of capacitors respectively into pulses corresponding to a modulated data signal and pulses corresponding to an inverted modulated data signal, and recovering the digital data signal from the pulses.

17. The method of claim 15, wherein recovering the digital data signal from the mixed data signals and the mixed inverted data signals includes generating, based upon a value at the respective first and second sets of capacitors, pulses corresponding to a modulated data signal and pulses corresponding to an inverted modulated data signal, and recovering the digital data signal from the pulses by identifying at least one of a rising edge and a falling edge of the data signal based upon at least one of first and last pulses in each respective series of consecutively-spaced pulses from each of the respective first and second sets of capacitors.

18. The method of claim 15, wherein recovering the digital data signal from the mixed data signals and the mixed inverted data signals includes recovering the digital data signal using the output of the first set of capacitors to determine a rising edge of the digital data signal, and using the output of the second set of capacitors to determine a falling edge of the digital data signal.

19. The method of claim 15, wherein generating the mixed data signals and generating the mixed inverted data signals include:

generating and providing the digital data signal mixed with the carrier signal to a first capacitor, and generating and providing the digital data signal mixed with the inverse of the carrier signal to a second capacitor, the first and second capacitors being in the first set of capacitors, and generating and providing the inverse of the digital data signal mixed with the carrier signal to a third capacitor, and generating and providing the inverse of the digital data signal mixed with the inverse of the carrier signal to a fourth capacitor, the third and fourth capacitors being in the second set of capacitors.

* * * * *